United States Patent [19]

Straayer

[11] Patent Number: 4,501,332
[45] Date of Patent: Feb. 26, 1985

[54] HAND CARRIED PORTABLE WEEDER CONVERTIBLE TO A CULTIVATOR APPARATUS

[75] Inventor: Robert O. Straayer, Houston, Tex.

[73] Assignee: Evolution Enterprises, Inc., Houston, Tex.

[21] Appl. No.: 427,874

[22] Filed: Sep. 29, 1982

[51] Int. Cl.³ .............................................. A01D 35/26
[52] U.S. Cl. ...................................... 172/41; 30/122; 30/276; 172/14
[58] Field of Search .............. 172/720, 41, 111, 120, 172/247, 253, 522, 604, 14; 30/122, 276, 500

[56] References Cited

U.S. PATENT DOCUMENTS

| 459,971 | 9/1891 | Arnett . | |
|---|---|---|---|
| 465,497 | 12/1891 | Randall . | |
| 673,304 | 4/1901 | Tharp . | |
| 1,158,906 | 11/1915 | Eccles | 172/522 |
| 1,370,774 | 3/1921 | Abernathy . | |
| 1,610,161 | 12/1926 | Russell . | |
| 2,214,063 | 9/1940 | Nagamatsu | 172/111 |
| 2,625,867 | 1/1953 | Hands . | |
| 2,774,292 | 12/1956 | Hartman . | |
| 2,888,084 | 5/1959 | Trecker . | |
| 3,200,890 | 8/1965 | Courtway . | |
| 3,708,967 | 1/1973 | Geist . | |
| 3,826,068 | 7/1974 | Ballas . | |
| 3,859,776 | 1/1975 | Ballas . | |
| 4,035,912 | 7/1977 | Ballas . | |
| 4,052,789 | 10/1977 | Ballas . | |
| 4,054,992 | 10/1977 | Ballas . | |
| 4,067,108 | 1/1978 | Ballas . | |
| 4,089,114 | 5/1978 | Doolittle et al. | 30/122 |
| 4,104,797 | 8/1978 | Ballas . | |
| 4,114,269 | 9/1978 | Ballas . | |
| 4,124,938 | 11/1978 | Ballas . | |
| 4,156,312 | 5/1979 | Ballas . | |
| 4,156,967 | 6/1979 | Ballas . | |
| 4,161,820 | 7/1979 | Moore . | |
| 4,167,812 | 9/1979 | Moore . | |
| 4,190,954 | 3/1980 | Walto . | |
| 4,242,794 | 1/1981 | Peterson | 30/122 |
| 4,269,372 | 5/1981 | Kwater . | |
| 4,357,752 | 11/1982 | Goodwin, Jr. | 30/122 |

FOREIGN PATENT DOCUMENTS 224100 8/1959 Australia .

*Primary Examiner*—Richard J. Johnson
*Attorney, Agent, or Firm*—Price, Heneveld, Huizenga & Cooper

[57] ABSTRACT

A hand carried portable weeder/cultivator apparatus for weeding and cultivating small areas such as flower and vegetable gardens having a uniquely shaped weeder/cultivator element of inverted dish-shape which is designed for converting conventional above ground, string-type weeders into a below ground weeder/cultivator.

5 Claims, 10 Drawing Figures

U.S. Patent  Feb. 26, 1985  Sheet 1 of 2  4,501,332
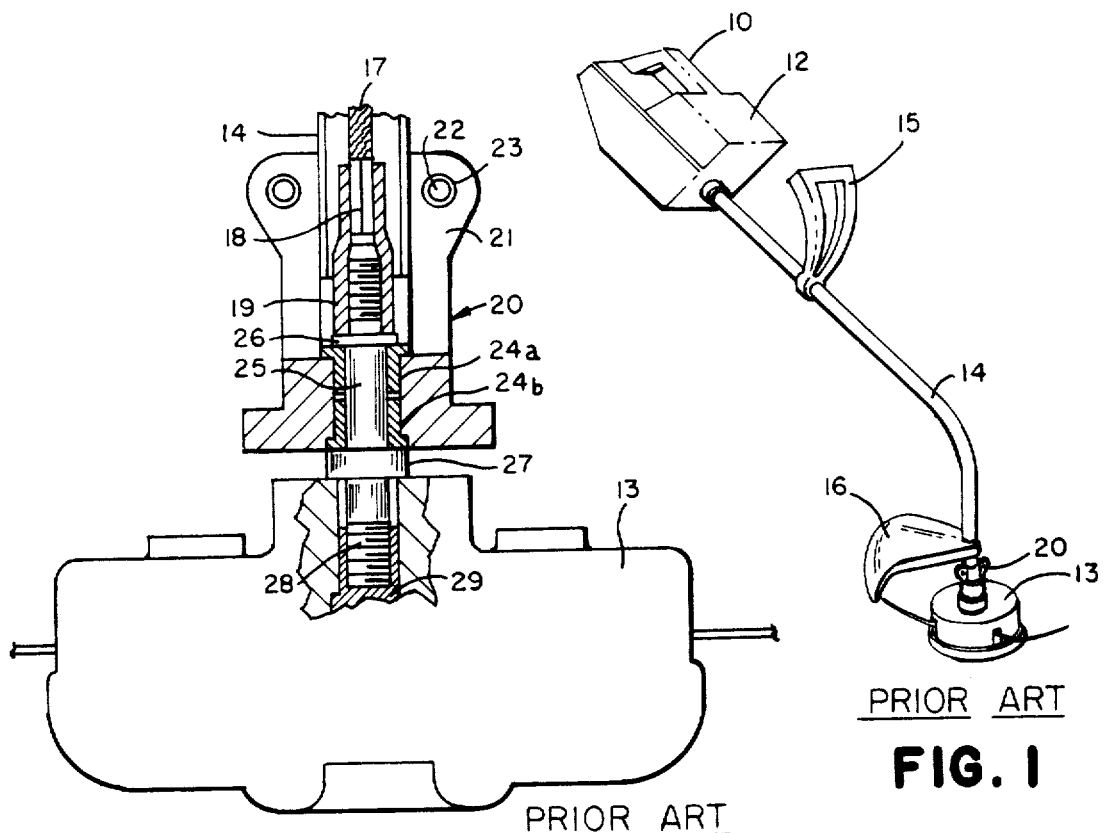
FIG. 1 PRIOR ART
FIG. 2 PRIOR ART
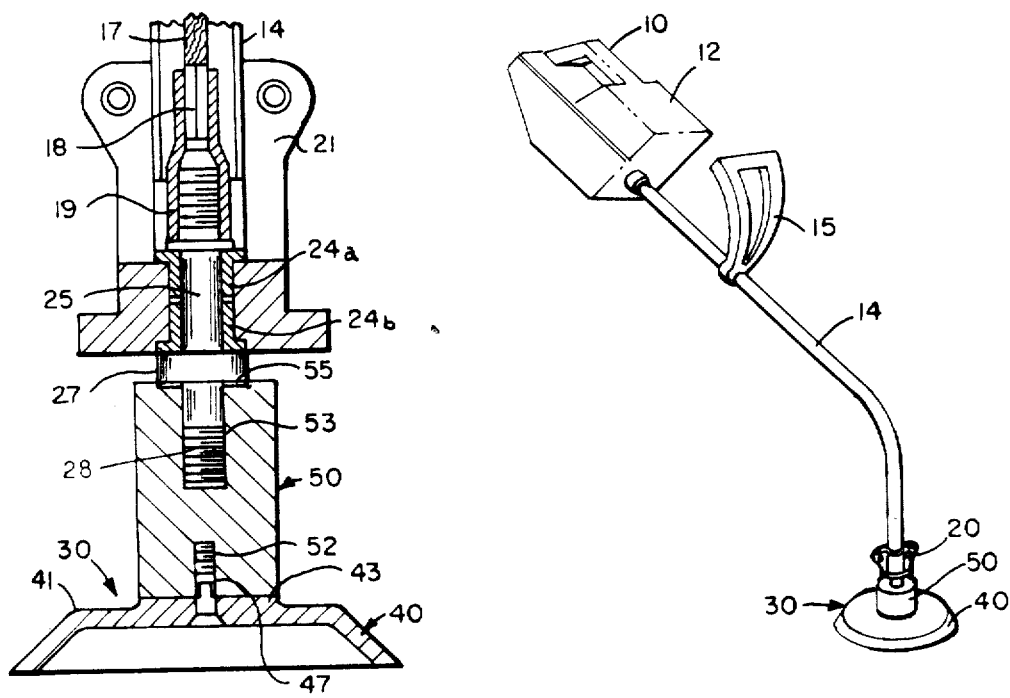
FIG. 4
FIG. 3

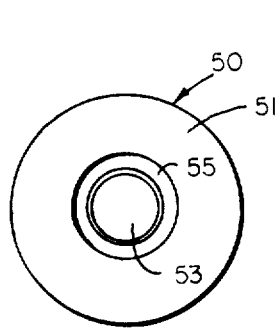
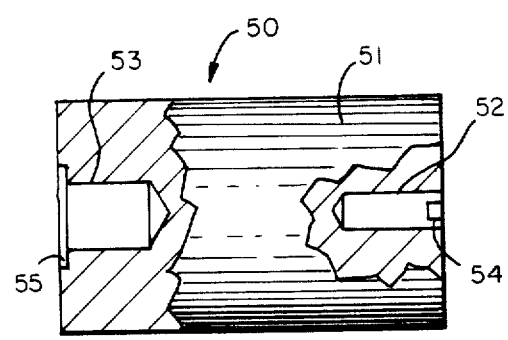
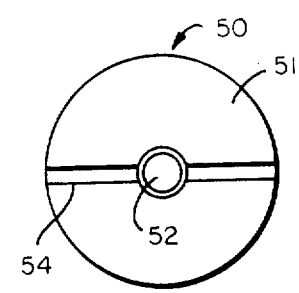
FIG. 6    FIG. 5    FIG. 7
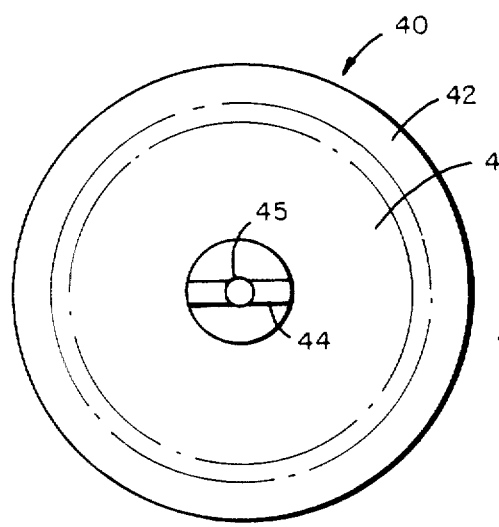
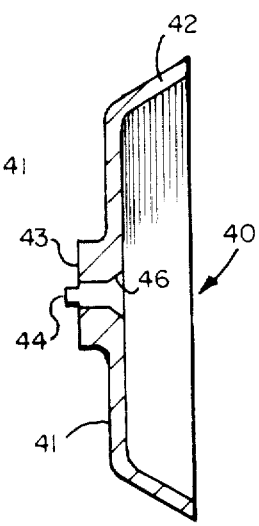
FIG. 9    FIG. 8
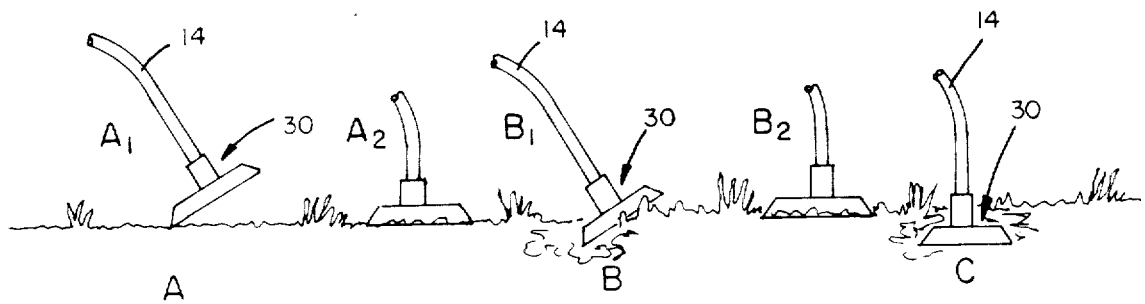
FIG. 10

HAND CARRIED PORTABLE WEEDER CONVERTIBLE TO A CULTIVATOR APPARATUS

This invention relates to a hand carried portable weeder/cultivator apparatus for weeding and cultivating relatively small areas such as flower and vegetable gardens. It more specifically relates to such a portable weeder/cultivator apparatus having a uniquely shaped weeder/cultivator element adapted for converting apparatus for cutting, trimming and edging vegetation above ground to an underground weeder/cultivator.

BACKGROUND OF THE INVENTION

There have been developed and are presently on the market several types of hand carried portable earth conditioning devices such as disclosed in U.S. Pat. Nos. 2,625,867 issued Jan. 20, 1953 to W. C. Hands, Jr., 2,774,292 issued Dec. 18, 1956 to E. Hartmann, and 2,888,084 issued May 26, 1959 to F. J. Trecker. However, all of these apparatus have several drawbacks. First among these drawbacks is their complicated mechanisms. As disclosed in these patents, all of them incorporate complicated gear mechanisms mounted in the head at the lower end of an elongated handle support. Such mechanisms require the apparatus be specifically designed and used only for conditioning the earth. There is no suggestion whatsoever of converting the apparatus into a device for cutting, trimming and edging vegetation located above ground. Nor has anyone conceived of converting above ground weed cutting devices such as disclosed in U.S. Pat. No. 3,708,967 issued Jan. 9, 1973 to Geist et al and 4,190,954 issued Mar. 4, 1980 to Walto (and a multitude of other patents) to underground weeder/cultivators.

Further, prior underground earth conditioning devices referred to above have pins, prongs, and/or tines which cut into the ground as they are forced downwardly by the operator. As a result, long weeds become entangled therein, requiring frequent cleaning of the same in order to continue the cultivation of the earth.

Another problem encountered with this type of cultivator is that in areas where the top of the earth has crushed stone or wood chips, the pins, prongs or tines mix the same with the earth thereby destroying the very purpose for the crushed stone and wood chips.

Another problem encountered with prior types of hand cultivators as disclosed in the above patents is that the good plants around which the cultivation is being done are quite frequently hit by these pins, prongs, etc. damaging the plant beyond repair. Therefore, it is extremely important extreme care be taken in the use of such apparatus to prevent striking the good plants.

Another problem with this prior type of apparatus is that quite frequently the pins, prongs and tines will miss severing the roots of the weeds permitting the weeds to regrow and therefore the weeding is only temporary.

SUMMARY OF THE INVENTION

In accordance with the present invention, I provide a novel apparatus for weeding and cultivating underneath the ground so as to avoid the problems encountered in the prior apparatus referred to above.

Specifically, I provide a weeder/cultivator element adapted to convert a conventional rotating string type weed cutter into a weeder/cultivator that will help eliminate weeds and root the weeds underneath the ground and at the same time cultivate the earth. This conversion is done by a simple step of removing the string head and replacing it with my disc-shaped cultivator element.

In accordance with my invention, I provide an inverted dish-shaped element that has a flat top wall with a depending edge inclined radially outwardly and downwardly from the periphery of the wall. This edge is formed preferably of an integral flange extending around the entire periphery of the circular flat top wall.

The inverted dish-shaped disc is preferably attached to the rotatable shaft of a conventional rotating string-type weed cutter apparatus, although it is within the broader spirit of my invention for the inverted dish-type weeder/cultivator element to have its own specially designed motor driven means. Also, in accordance with my preferred embodiment of this invention, I provide a cylindrical element secured to the upper side of the flat top wall of the disc and extending upwardly therefrom providing a neck which in turn at the other end is attached to the rotating shaft of the apparatus, be it shaft of a string-type weed cutter apparatus or to its own specially designed rotating driver.

With my invention, long weeds do not become entangled in any pins, prongs, etc., the disc can be forced underneath crushed stone and wood chips thus "spinning" up weeds with their roots without mixing the stone and wood chips with the earth. Further, in most instances, any good plants which are accidentally "spun" out will not be permanently damaged and can be replanted. In addition with my invention, the weeds are "spun" up with roots which substantially minimizes the possibility of weeds regrowing.

DETAILED DESCRIPTION OF THE INVENTION

My invention is described in more detail hereinafter by reference to the accompanying drawings wherein like reference characters refer to the same parts throughout the several views and in which:

FIG. 1 is one of many prior art above ground, string-type, weed cutters which is specifically adapted for cutting weeds or other vegetation above the ground;

FIG. 2 is an enlarged and partially cutaway view of the head of the weed cutter apparatus of FIG. 1;

FIG. 3 is a perspective view of my invention showing the apparatus of FIG. 1 converted into a weeder/cultivator by the substitution of my weeder/cultivator element for the string-type head of FIG. 1;

FIG. 4 is an elevational, cross-sectional view of the lower end of the apparatus of FIG. 3 showing the attachment of my weeder/cultivator element to one conventional string-type above ground weeder;

FIG. 5 is a side-elevational, partially cutaway view of the adaptor used for connecting my inverted dish-shaped cultivator element to the driver mechanism;

FIG. 6 is an end view of the adaptor of FIG. 5;

FIG. 7 is another end view of the other end of adaptor of FIG. 5;

FIG. 8 is a cross-sectional view of my weeder/cultivator disc;

FIG. 9 is a plan view of the disc of FIG. 8; and

FIG. 10 is sketches lettered A, B and C of various positions of my weeder/cultivator when operated.

Referring to FIGS. 1 and 2, they disclose the string-type weed cutter designated generally by the reference numeral 11 having a power means in the form of a motor 12 on the top end thereof and provided with a rotating head 13 at the lower end thereof. The motor 12 and head 13 are mounted on opposite ends of the elongated pipe-like support member 14. Also mounted on support member 14 is the handle 15 located near the motor and guard 16 mounted adjacent the rotating head 13. As is well-known in the art and specifically disclosed in U.S. Pat. No. 3,708,967, the motor or engine 12 rotates a flexible drive shaft 17. The lower end of drive shaft 17 is provided with a rectilinearly-shaped end 18 inserted into a coupling 19 for rotation therewith. Coupling 19 is arranged for rotation in a power head 20 attached to the lower end of the tubular support 14 by means of the clamping elements 21 having the openings 23 through which clamping screws 22 extend for clamping the power head onto the lower end of the tubular support 14.

Mounted in the head are the bushings 24a and 24b rotatably supporting the drive shaft 25 which is in threaded engagement with the coupling 19. The drive shaft 25 is spaced from the lower end of coupling 19 by the thrust washer 26. Shaft 25 has a shoulder 27 engaging enlarged ends of the bushings 24, thus acting as a thrust bearing against the bushing 24b.

End 28 of the drive shaft 25 is threaded for receiving the string head 13 which includes the threaded insert 29 in which the threaded end of the drive shaft is threaded.

It should be understood FIGS. 1 and 2 are submitted for the purpose of showing one environment in which the novel weeder/cultivator element of this invention can be utilized. It should be clearly understood that my weeder/cultivator element can be utilized with many other string-type weeder cutters like that disclosed in FIGS. 1 and 2.

Referring now to FIG. 3 illustrating my invention, it will be seen that the only modification in the apparatus of FIGS. 1 and 2 is the removal of the guard 16 of FIG. 1 and the substitution of my weeder/cultivator element 30 for the string head of the apparatus of FIGS. 1 and 2. Thus, in FIG. 3 is disclosed the motor or engine 12, support 14, power head 20, handle 15 and the weeder/cultivator element 30.

Referring specifically to FIGS. 4-9, it will be seen that my novel weeder/cultivator element 30 is constructed of a simple assembly comprising the inverted dish-shaped element or disc 40 and cylindrical neck 50 attached to the drive shaft 28 of the prior art power head 20 previously described in relation to FIG. 2.

The construction of disc 40 is best shown by FIGS. 4, 8 and 9. As disclosed, the disc has an inverted dish-shape comprising the flat top wall 41, a flange 42 extending radially outwardly and downwardly from the wall and integral therewith, and a boss 43 extending upwardly and integral with the wall 41. Boss 43 has an elongated protrusion ridge 44. Through the central axis of the disc is an opening 45 for receiving a bolt 47 as will be described hereinafter. The bottom or lower portion of the opening 45 is flared at 46 to receive the flared head of the bolt as will be described.

The inclined angle of the flange 42 is preferably in the range of 30°-60°. However, within the broader aspects of this invention, it can vary as much as from 10°-80°. An overall disc thickness of 0.40 inches from the top surface of the top wall to the very bottom of the flanges has been found to work very satisfactorily. The disc may be constructed of a rigid material such as metals, plastics and nylons. I have found that 8253 Nylon works very satisfactorily. The diameter of the disc may also vary. My experiments have disclosed a good dimension that will produce satisfactory results, as will be described hereinafter, is 3-6 inches. I have also found that the thickness of 0.15 inch for the top walls and the flanges also works satisfactorily, although within the broadest aspects of this invention, the thicknesses can also vary.

The adaptor or cylindrical neck 50 shown in FIGS. 4, 5, 6, and 7 is provided for attaching the disc 40 to the shaft 28 of the power head 20. This adaptor comprises a solid body 51 having the tapped openings 52 and 53 at opposite ends. At the end containing the tapped opening 52 an elongated rectilinear recess 54 is provided to extend across the entire diameter of the cylinder 50. The recess 54 receives the ridge or protrusion 44 on the disc 40. At the other end of the cylinder containing the tapped opening 53 is circular recess 55 provided to receive the shoulder of the drive shaft 25, previously described.

Adaptor 50 is attached to the disc 40, as disclosed in FIG. 4, by placing the recess 54 over the ridge 44 and securing the two together by means of a dead end bolt 47. The adaptor 50 provides a cylindrical neck for locating the disc 40 a sufficient distance away from the power head 20 so as to permit the proper operation of the device as will be explained hereinafter.

Referring specifically to FIG. 4, it will be seen that the assembly constituting the disc 40 and adaptor 50 is easily assembled on the threaded end of the drive shaft 25 by screwing the adaptor onto such threaded end. In so doing, the shoulder 27 fits into the recess 55 on the adaptor 50. Having installed the weeder/cultivator element on the drive shaft 25, the resultant apparatus is as disclosed in FIG. 3 of which the operation will now be described.

OPERATION

Before describing the operation in detail, it should be understood that the present invention can be used to convert above ground, string-type weed cutter apparatus as disclosed in FIGS. 1 and 2 into an underground weeder/cultivator. This is easily accomplished by unscrewing the string head 13 from the drive shaft 25 and replacing it with the weeder/cultivator element 30 formed by the assembly of the adaptor 50 and disc 40. Having made this substitution, the motor or engine 12 rotatably drives element 30. The operator carries the apparatus of FIG. 3 and controls the position of the rotating disc 40 of element 30 in relation to the earth by means of the handle 10 on the motor or engine 12 and handle 15. Different models of string-type weed cutters have different shapes and positions of handles but it is well within the skill in the art to manipulate the position of the disc with such handles. Therefore, no further explanation or discussion of the same will be made.

FIG. 10 discloses positions A, B and C of the weeder/cultivator element of this invention in operating the same for cultivating, it being understood the element moves through many intermediate positions. The first position as illustrated by A is to arrange the disc in a tipped ($A_1$) or flat ($A_2$) position. For harder soil, the edge of the flange 42 is arranged to be first forced into the earth. The second sketch B shows positions ($B_1$ for harder soil and $B_2$ for softer soil) wherein the disc has penetrated more deeply into the earth as it is being forced by the operator to weeding/cultivating position of sketch C. Sketch C discloses the ultimate position desired for the weeder/cultivator to perform most satisfactorily. In this position, the top surface of the flat top wall 41 is substantially parallel to the surface of the earth. In this position, the disc is moved in all directions as indicated by the arrows and in movement the churning effect produced by the spinning top flat surface "spins" the complete weed, with root, to the surface and cultivates the soil.

It should be readily evident that because of the absence of any pins, prongs, tines or the like, there is very little tendency at all for the disc to become entangled in long weeds which would require the discontinuation of the cultivating for the purpose of removing the weeds. This is primarily due to the fact that the rotating parts of the cultivator are located under the ground and, as a result, there is very little tendency for the long weeds above the ground to become entangled therein.

It should also be evident that once the disc is in position C it does not disturb media such as crushed stone, wood chips or other mulching on the top of the surface of the earth although it spins out the weeds and cultivates under such media since all the work is done underneath the same. Therefore, my weeder/cultivator does not mix such media with the ground.

It should also be evident that if my weeder/cultivator does engage a good plant, in most instances the disturbance will be only in "spinning up" the complete plant with root which can be replanted.

Having described my invention, it should become quite evident that although I have disclosed a preferred embodiment, other variations and modifications may be made in the structures and in the dimensions of my invention without departing from the spirit and the essential concepts of my invention. Accordingly, it should be clearly understood that the embodiments disclosed herein and depicted in the accompanying drawings, are exemplary only and are not intended as limitations in the scope of the present invention.

The embodiments of the invention in which an exclusive property or privilege is claimed are defined as follows:

1. A hand carried and operated portable cultivator comprising an elongated support means having a handle at one end and a power head with a rotatable driver means at the other end; motive power means for rotatably driving said driver means about an axis adapted by an operator to be arranged from a position inclined to the earth to be cultivated to a perpendicular position thereto; said motive power means including said power head at said other end; a shaft means operatively connected to said power head on said axis; a cultivator member; attachment means including a spacer member for attaching said cultivator member to said shaft means, said cultivator member including a disc with a central circular top wall portion and with a depending flange around the circumference thereof, the outer wall portion of said flange inclined radially outwardly and downwardly from the top wall portion, the distance from the top of said top wall portion to the bottom of said depending flange being more than twice as large as the thickness of said top wall; said spacer member being more than twice as long as the distance from said top of said top wall portion to the bottom of said depending flange whereby said spacer member spaces the top wall portion of said cultivator member a distance from said power head to permit said cultivator member to be positioned a substantial distance under the earth while said power head remains above said earth; said elongated support means and handle being adapted to permit an operator to manipulate said elongated support means whereby said cultivator member can be arranged at an angle to the earth and moved into the earth for causing the depending flange of said cultivator member to cut through and penetrate said soil to a buried position under said soil without interference of said power head and then said cultivator member can be manipulated to a position wherein said flat top wall portion is parallel to the surface of said earth to maintain the buried position of said cultivator and cultivate the earth.

2. An underground weeder/cultivator means for converting a conventional hand carried apparatus normally used for cutting, trimming and edging vegetation above ground to an underground weeder/cultivator apparatus, said conventional hand carried apparatus having an elongated support means including an upper handle end and a lower end, a rotatable support member at the said lower end of said elongated support means and supporting a plurality of string-like members attached thereto and extending from its periphery, driver means including a power head at the lower end of said elongated support means and having shaft means extending from the lower end thereof for operatively attaching said rotatable support member to said power head; said underground weeder/cultivator including a cultivator member having attachment means adapted to be attached to said shaft when said support member is removed whereby said cultivator member can be substituted for said rotatable cutter member; said cultivator member including a disc with a central circular top wall portion and with a depending flange around the circumference thereof, the outer wall portion of said flange inclined radially outwardly and downwardly from the top wall portion, the distance from the top of said top wall portion to the bottom of said depending flange being more than twice as large as the thickness of said top wall; said attachment means including a spacer member for spacing said flat top wall portion of said cultivator member a distance from said power head; said spacer member being more than twice as long as the distance from said top of said top wall portion to the bottom of said depending flange to permit said flat top to be located a substantial distance under the earth while the power head remains above the earth; a handle on the upper handle end provided for the operator to manipulate said elongated support means whereby said cultivator member can be arranged at an angle to the earth and moved into the earth for causing the depending flange of said cultivator member to cut through and penetrate said soil to a buried position under said soil without interference from said power head and then said cultivator member can be manipulated to a position wherein said flat top wall portion is parallel to the surface of said earth to maintain the buried position of said cultivator and cultivate the soil.

3. An adapter means for converting apparatus for cutting, trimming and edging vegetation above ground to an underground cultivator, said apparatus conventionally having an elongated support means including an upper handle end and a lower end, a rotatable support member supporting a plurality of string-like members attached thereto and extending from its periphery, driver means mounted on said elongated support means, and connecting means rotatably connected to said driver means and including a power head at the said lower end of said support elongated means, said power head having shaft means extending from the lower end of said apparatus for attaching said rotatable support member to said power head; said adaptor means comprising an elongated cylindrical spacer member adapted to be attached at one end to said shaft; a circular disc shaped cultivator member having a central circular top wall portion and with a depending flange around the circumference thereof, the outer wall portion of said flange inclined radially outwardly and downwardly from the top wall portion the distance from the top of said top wall portion to the bottom of said depending flange being more than twice as large as the thickness of said top wall; and attachment means for attaching said cylindrical spacer member to said top wall portion of said disc shaped cultivator member without relative motion therebetween; said cylindrical spacer member being more than twice as long as the distance from said top of said top wall portion to the bottom of said depending flange to space and locate said disc shaped cultivator member a sufficient distance from said power head to permit said cultivator member to be positioned a substantial distance under the earth while said power head remains above said earth whereby when said cultivator member is substituted for said rotatable support member the cultivator member can be manipulated to penetrate the soil and be buried thereunder for cultivating the soil without interference from said power head.

4. A cultivator means for mounting on the end of a rotating driver member comprising: an inverted dish-shaped element including a disc with a central circular top wall portion and with a depending flange around the circumference thereof, the outer wall portion of said flange inclined radially outwardly and downwardly from the top wall portion, the distance from the top of said top wall portion to the bottom of said depending flange being more than twice as large as the thickness of said top wall; said outer surface of said flange being inclined at an angle from said flat top wall portion and terminating at a circular edge; and attachment means for attaching said dish-shaped element to the proper head of a rotating driver member so that said edge means extends in a direction away from said power head said attachment means including an elongated cylindrical member adapted at one end to be attached to a driver member and at the other end to said top wall of said dish-shaped element with the said outer surface of said flange inclined radially outwardly and in a direction away from the cylindrical member; said spacer member being more than twice as long as the distance from said top of said top wall portion to the bottom of said depending flange whereby said spacer member spaces the top wall portion of said cultivator member a distance from said power head to permit said cultivator member to be positioned a substantial distance under the earth while said power head remains above said earth and means for preventing relative motion between cylindrical member and said dish-shaped element.

5. The cultivator means of claim 4 in which the means for preventing relative motion between the cylindrical member and the dish-shaped element is a ridge formed on one of the said cylindrical member and dish-shaped element and a recess formed in the other of said member and element and receiving said ridge.

* * * * *